No. 706,445. Patented Aug. 5, 1902.
C. C. OSENBAUGH & R. L. GIBSON.
RAIL JOINT.
(Application filed June 6, 1902.)
(No Model.)
Fig. 1.
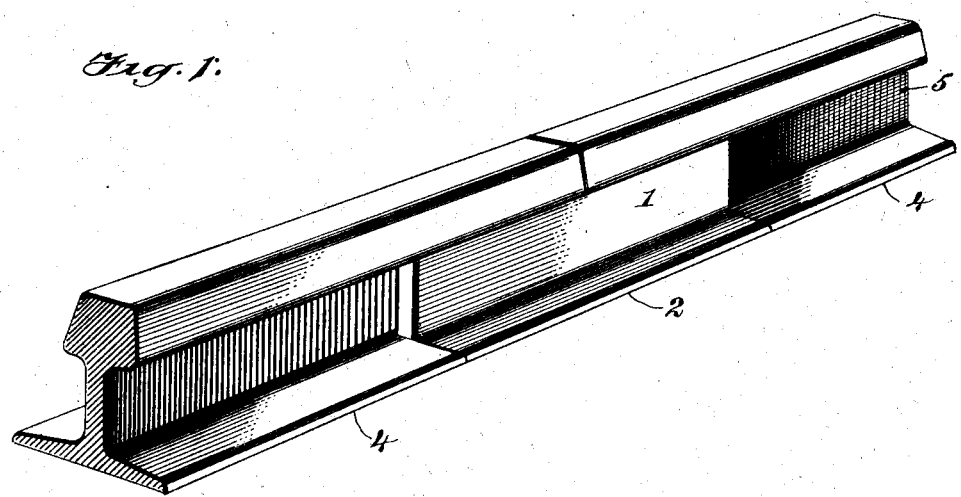
Fig. 2.
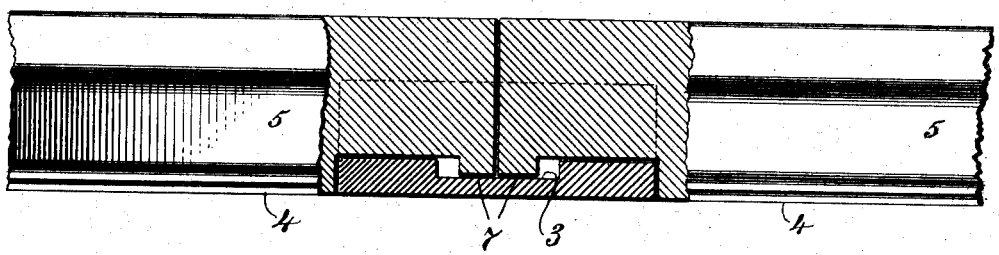
Fig. 3. Fig. 4.
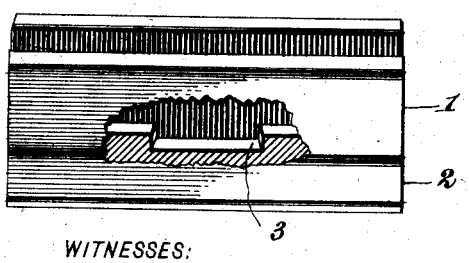 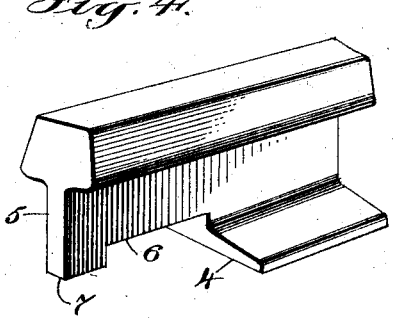
WITNESSES:
Geo. W. Naylor
C. R. Ferguson
INVENTORS
Randall L. Gibson
Charles C. Osenbaugh
BY
ATTORNEYS.

UNITED STATES PATENT OFFICE.

CHARLES CURTIS OSENBAUGH AND RANDALL LAUGHLIN GIBSON, OF REMINGTON, PENNSYLVANIA.

RAIL-JOINT.

SPECIFICATION forming part of Letters Patent No. 706,445, dated August 5, 1902.

Application filed June 6, 1902. Serial No. 110,450. (No model.)

*To all whom it may concern:*

Be it known that we, CHARLES CURTIS OSENBAUGH and RANDALL LAUGHLIN GIBSON, citizens of the United States, and residents of Remington, in the county of Allegheny and State of Pennsylvania, have invented a new and Improved Rail-Joint, of which the following is a full, clear, and exact description.

This invention relates to improvements in joints for railway-rails, bridge-trusses, and the like; and the object is to provide a simple joint that will join the meeting ends of rails in proper relation to each other without the use of bolts and nuts and that will allow the expansion and contraction of the rails without danger of buckling.

We will describe a rail-joint embodying our invention and then point out the novel features in the appended claims.

Reference is to be had to the accompanying drawings, forming a part of this specification, in which similar characters of reference indicate corresponding parts in all the figures.

Figure 1 is a perspective view of two rail-sections with a joint embodying the invention. Fig. 2 is a sectional view thereof. Fig. 3 is a perspective view of the joint, and Fig. 4 is a perspective view of one end of a rail.

The joint comprises a trough-shaped boxing having side pieces 1 for engaging against the opposite sides of the rail-webs, and at the lower side are flanges 2, corresponding to the rail-flanges. The bottom wall of the joint has a recess 3. The base-flange portion of the end of each rail is cut away, as indicated at 4, the end of this flange being designed to engage against the end of the joint, as clearly indicated in Figs. 1 and 2. The web portion 5 of the rail is recessed on its under side, as at 6, and at the end of this recess is a lug 7, designed to engage in the depression or recess 3.

In connecting the rails the ends thereof are to be placed within the joint and the lug 7 inserted in the recess 3, this recess being somewhat longer than the combined length or width of the lugs, thus permitting of longitudinal contraction and expansion of the rails. The joint will be of sufficient length to engage upon two cross-ties, to which it may be secured by spikes, and the rails will also be secured by spikes to the cross-ties.

It is obvious that the side pieces of the joint will prevent any possible side movements of the ends of the rails.

As before stated, this invention is not confined to railway-rails, as it is obvious that it may be employed in connection with other devices, such as bridge-trusses or bridge-rails.

Having thus described our invention, we claim as new and desire to secure by Letters Patent—

1. A rail-joint comprising a boxing having side pieces to engage against the sides of joining-rails, the bottom wall of said boxing having a depression or recess, rails adapted to engage with their lower portions against the ends of said joint, and lugs on the rails for engaging in said recess or depression, substantially as specified.

2. A joint for railway-rails comprising a boxing having side pieces for engaging against the web portions of joining rails, flanges extended outward from the bottom of the boxing and adapted to engage between flanges of the rail-sections, the bottom wall of said boxing having a depression or recess, and lugs on the under sides of the rail-webs at the ends for engaging in said recess or depression, the recess or depression being longer than the combined length of the lugs, substantially as specified.

In testimony whereof we have signed our names to this specification in the presence of two subscribing witnesses.

CHARLES CURTIS OSENBAUGH.
    RANDALL LAUGHLIN GIBSON.

Witnesses:
 L. W. STONE,
 W. S. CAMPBELL.